(12) United States Patent
Foster

(10) Patent No.: US 8,688,874 B2
(45) Date of Patent: Apr. 1, 2014

(54) METHOD AND SYSTEM FOR REDUCING TRIGGERING LATENCY IN UNIVERSAL SERIAL BUS DATA ACQUISITION

(75) Inventor: Peter Foster, Kent Town (AU)

(73) Assignee: Chronologic Pty. Ltd., Adelaide, SA (AU)

( * ) Notice: Subject to any disclaimer, the term of this patent is extended or adjusted under 35 U.S.C. 154(b) by 1060 days.

(21) Appl. No.: 12/527,822

(22) PCT Filed: May 12, 2008

(86) PCT No.: PCT/AU2008/000662
§ 371 (c)(1),
(2), (4) Date: Sep. 10, 2009

(87) PCT Pub. No.: WO2008/138052
PCT Pub. Date: Nov. 20, 2008

(65) Prior Publication Data
US 2010/0057955 A1    Mar. 4, 2010

Related U.S. Application Data

(60) Provisional application No. 60/938,136, filed on May 15, 2007.

(51) Int. Cl.
G06F 3/00 (2006.01)
G06F 5/00 (2006.01)

(52) U.S. Cl.
USPC ............................................. 710/61; 710/20

(58) Field of Classification Search
None
See application file for complete search history.

(56) References Cited

U.S. PATENT DOCUMENTS

| 2,862,251 A | 12/1958 | Kalwaites |
| 3,121,660 A | 2/1964 | Hall, Jr. |
| 3,323,226 A | 6/1967 | Beaumont et al. |
| 3,399,111 A | 8/1968 | Beaumont et al. |

(Continued)

FOREIGN PATENT DOCUMENTS

| EP | 1393 426 | 9/1972 |
| EP | 0037387 | 10/1981 |

(Continued)

OTHER PUBLICATIONS

European Search Report.

*Primary Examiner* — Kris Rhu
(74) *Attorney, Agent, or Firm* — Frommer Lawrence & Haug LLP; Ronald R Santucci

(57) ABSTRACT

A method of controlling one or more devices in data communication with a common controller to perform one or more functions, each of the devices having a synchronous clock, a synchronized real time clock register and a memory, the method comprising: arming the devices such that the devices commence performing the functions synchronously, receive and store to their respective memory data acquired as a result of performing the functions and store to their respective memory time stamp information indicative of the time of acquisition of the acquired data; a trigger device in data communication with the common controller responding to a command to perform the functions by sending a first message to the host controller that includes data indicative of a time of receipt of the command; the host controller responding to the first message by sending the devices a second message including data indicative of the time of receipt by the further device of the command; and the devices responding to the second message by reading their respective memories and sending the acquired data stored therein to the host controller commencing from a location in each respective memory corresponding to the time of receipt or a next available location.

5 Claims, 4 Drawing Sheets

(56) References Cited

U.S. PATENT DOCUMENTS

| | | | |
|---|---|---|---|
| 4,085,485 A | 4/1978 | Brandon et al. | |
| 4,206,258 A | 6/1980 | Balcar | |
| 4,446,187 A | 5/1984 | Eklund | |
| 4,537,658 A | 8/1985 | Albert | |
| 4,541,895 A | 9/1985 | Albert | |
| 5,208,087 A | 5/1993 | Stigberg | |
| 5,293,374 A | 3/1994 | Eidson | |
| 5,549,193 A | 8/1996 | Schlueter, Jr. et al. | |
| 5,566,180 A * | 10/1996 | Eidson et al. | 370/473 |
| 5,679,222 A | 10/1997 | Rasch et al. | |
| 5,713,399 A | 2/1998 | Collette et al. | |
| 5,730,817 A | 3/1998 | Feygin et al. | |
| 5,761,537 A | 6/1998 | Sturges et al. | |
| 5,827,597 A | 10/1998 | James et al. | |
| 5,837,102 A | 11/1998 | Graf | |
| 5,900,122 A | 5/1999 | Huston | |
| 5,906,786 A | 5/1999 | James et al. | |
| 5,916,462 A | 6/1999 | James et al. | |
| 5,972,813 A | 10/1999 | Polat et al. | |
| 6,010,598 A | 1/2000 | Boutilier et al. | |
| 6,012,115 A | 1/2000 | Chambers et al. | |
| 6,092,210 A | 7/2000 | Larky et al. | |
| 6,159,880 A | 12/2000 | Schiel | |
| 6,171,447 B1 | 1/2001 | Trokhan | |
| 6,226,701 B1 | 5/2001 | Chambers et al. | |
| 6,274,042 B1 | 8/2001 | Beck | |
| 6,290,818 B1 | 9/2001 | Romanski | |
| 6,331,341 B1 | 12/2001 | Joyce | |
| 6,340,413 B1 | 1/2002 | Nilsson et al. | |
| 6,343,364 B1 | 1/2002 | Leydier et al. | |
| 6,436,240 B1 | 8/2002 | Jeffrey | |
| 6,610,173 B1 | 8/2003 | Lindsay et al. | |
| 6,616,812 B2 | 9/2003 | Beck | |
| 6,616,814 B2 | 9/2003 | Best | |
| 6,630,223 B2 | 10/2003 | Hansen | |
| 6,712,940 B2 | 3/2004 | Crook | |
| 6,780,282 B2 | 8/2004 | Scherb et al. | |
| 6,865,784 B2 | 3/2005 | Nolle | |
| 6,875,315 B2 | 4/2005 | Bakken et al. | |
| 7,005,044 B2 | 2/2006 | Kramer et al. | |
| 7,128,809 B2 | 10/2006 | Viinson et al. | |
| 7,128,810 B2 | 10/2006 | Hansen | |
| 7,294,237 B2 | 11/2007 | Herman et al. | |
| 7,294,238 B2 | 11/2007 | Bakken et al. | |
| 7,297,233 B2 | 11/2007 | Herman et al. | |
| 7,494,571 B2 | 2/2009 | Takamura | |
| 7,501,044 B2 | 3/2009 | Hikida et al. | |
| 7,504,060 B2 | 3/2009 | Brock et al. | |
| 7,524,403 B2 | 4/2009 | Fernandes et al. | |
| 7,527,709 B2 | 5/2009 | Lippi Alves Fernandes et al. | |
| 7,539,793 B2 | 5/2009 | Foster et al. | |
| 7,540,942 B2 | 6/2009 | Hikita | |
| 7,550,061 B2 | 6/2009 | Walkenhaus et al. | |
| 2003/0145444 A1 | 8/2003 | Schmitz | |
| 2003/0158706 A1 | 8/2003 | Eidson | |
| 2004/0069432 A1 | 4/2004 | Hansen | |
| 2004/0088445 A1* | 5/2004 | Weigold et al. | 710/8 |
| 2004/0102693 A1 | 5/2004 | Jenkins | |
| 2004/0118545 A1 | 6/2004 | Bakken et al. | |
| 2004/0118546 A1 | 6/2004 | Bakken et al. | |
| 2004/0187044 A1 | 9/2004 | Barman et al. | |
| 2005/0167062 A1 | 8/2005 | Herman et al. | |
| 2006/0064522 A1* | 3/2006 | Weigold et al. | 710/61 |
| 2006/0179144 A1* | 8/2006 | Nagase | 709/226 |
| 2007/0043533 A1 | 2/2007 | Wiles et al. | |
| 2007/0134467 A1 | 6/2007 | Sayers | |
| 2007/0167099 A1 | 7/2007 | Patel et al. | |
| 2009/0222685 A1* | 9/2009 | Foster et al. | 713/500 |

FOREIGN PATENT DOCUMENTS

| | | |
|---|---|---|
| EP | 0103376 | 7/1983 |
| EP | 147904 | 7/1985 |
| EP | 0337451 | 10/1989 |
| EP | 0446432 A1 | 9/1991 |
| EP | 0585479 A1 | 9/1994 |
| EP | 0868251 | 11/2004 |
| EP | 1566259 | 8/2005 |
| FR | 1460513 | 10/1966 |
| GB | 1515455 | 6/1978 |
| JP | 61020686 | 1/1986 |
| JP | 06-170959 | 6/1994 |
| WO | WO/01/42939 A1 | 6/2001 |
| WO | WO 02/41815 | 5/2002 |
| WO | WO 2004/008330 A | 1/2004 |
| WO | WO 2004/038093 | 5/2004 |
| WO | WO 2005/042836 | 5/2005 |
| WO | WO 2007/092997 A | 8/2007 |
| WO | WO 2010/030298 | 3/2010 |

* cited by examiner

METHOD AND SYSTEM FOR REDUCING TRIGGERING LATENCY IN UNIVERSAL SERIAL BUS DATA ACQUISITION

RELATED APPLICATION

This application is a 371 of PCT/AU2008/000662 filed on May 12, 2008, published on Nov. 20, 2008 under publication number WO 2008/138052 A and claims priority benefits of U.S. Provisional Patent Application Ser. No. 60/938,136 filed May 15, 2007, the disclosure of which is hereby incorporated by reference.

FIELD OF THE INVENTION

The present invention relates to a method and system for reducing triggering latency in universal serial bus data acquisition, of particular but by no means exclusive application in the provision of synchronization and timing systems, and clocks; in data acquisition and the automation and control of test and measurement equipment, instrumentation interfaces and process control equipment; and in particular for synchronizing such apparatuses to an essentially arbitrary degree in either a local environment or in a distributed scheme.

BACKGROUND OF THE INVENTION

The USB specification is intended to facilitate the interoperation of devices, such as from different vendors, in an open architecture. USB data is encoded using differential signaling (i.e. two wires transfer the information) in the form of the difference between the signal levels of those two wires. The USB specification is intended as an enhancement to the PC architecture, in portable, desktop and home environments.

The USB specification assumes that devices differ. This is true for the intended environments in which devices from a multiplicity of manufacturers are connected, but there exist other environments (such as certain common industrial or laboratory environments) that require a specification for operating multiple devices of a similar nature in a synchronized manner. The specification does not sufficiently address this issue. Such environments are typically those where testing, measuring or monitoring is performed, and which require the devices to be synchronized to a more accurate degree than is specified. The USB specification allows limited inter-device synchronization by providing a 1 kHz clock signal to all devices. However, many laboratory and industrial environments require synchronization at megahertz frequencies and higher.

USB employs a tiered star topology, where hubs provide attachment points for USB devices. The USB host controller which is located on the user's personal computer (PC), laptop or personal digital assistant (PDA) contains the root hub, which is the origin of all USB ports in the system. The root hub provides a number of USB ports to which USB functional devices or additional hubs may be attached.

In turn, one can attach more hubs (such as USB composite devices) to any of these ports, which then provide additional attachment points via ports for further USB devices. In this way, USB allows up to 127 devices (including hubs) to be connected, though no device may be more than five levels deep.

The root hub in the host transmits a Start of Frame (SOF) signal packet every 1 ms to every device, the time between two SOF packets being termed a frame. Each module receives this SOF packet at a different time, owing to signal transmission delays inevitable in a USB topology. The topology means that there may be a significant time delay (specified as ≤380 ns) for receiving the same signal between a device that is connected directly to the host controller and a device that is five levels down. This is a severe restriction when there is a need to synchronize devices at megahertz levels and above. Furthermore the USB specification allows the host controller to fail to transmit up to five consecutive SOF tokens.

In one existing approach, synchronization between a USB host and a USB device is possible by two types of USB transfers, Interrupt and Isochronous. Interrupt transfers provide guaranteed polling frequencies of devices with minimum periods of 125 μs, whereas isochronous transfers guarantee a constant transfer rate. Both methods require there to be traffic between the device and host for synchronization to take place and therefore reserve more bandwidth for higher degrees of synchronization. However, this means that the available USB bandwidth can be used up before the maximum number of devices has been connected. This approach also imposes on the host the computational burden of synchronizing 127 devices to the host with software, yet still fails to maintain synchrony between the devices as, to the host, the individual devices represent separate processes.

Devices that contain a physical transducer, such as a laser diode or a photodetector, may require clock and trigger information. A device such as a laser diode with a modulated light output at 1 MHz may use a clock signal to perform transducer functions at regular intervals or at a constant frequency. A trigger signal is usually used to start or end an operation at a set time. In the laser diode example, a trigger signal could be used to turn the modulated light output on or off.

These clock and trigger signals can be used to synchronize a multiplicity of devices to each other (and hence constitute what is referred to below as "synchronization information"), provided that the signals are common and simultaneous to all devices. 'Common' and 'simultaneous' here mean that the variation in time of these signals between the devices is less than a specified quantity, δt. In the laser diode example, this would enable a multiplicity of laser diodes to modulate their light output at one frequency. The modulation frequency of all devices would be the same, and their waveforms would be in-phase. The current USB specification (viz. 2.0) allows for a δt of up to 0.35 μs. For a signal with a frequency of 1 MHz and a period of 1.0 μs, this delay represents almost half of the period. It is thus unusable as synchronization information for routine use.

Devices such as hubs and USB controller chips commonly use some amount of phase locking in order to decode the USB protocol. It is the purpose of the SYNC pattern in the USB protocol to provide a synchronization pattern for another electronic circuit to lock to. However, this is intended to synchronize the device to the USB bit streams to an accuracy sufficient to interpret MHz bit streams. It is not intended to synchronize two separate devices to each other to the level required by many test and measurement instruments. The USB specification—to the extent that it deals with inter-device synchronization—is mainly concerned with synchronizing a USB-CD audio stream sufficiently for output on a USB-speaker pair. The requirements of such an arrangement are in the kHz range and, for this application, the USB specification is satisfactory. However, the specification does not address the potential problems of synchronizing, for example, 100 USB-speaker pairs.

As discussed above, USB communication transfers data during regular 1 ms frames (or, in the case of the High-Speed USB specification, in eight micro-frames per 1 ms frame). A Start of Frame (SOF) packet is transmitted to all but Low-Speed devices at the beginning of each frame and to all High-Speed devices at the beginning of each micro-frame. The SOF packet therefore represents a periodic low resolution signal broadcast to all but Low-Speed devices connected to a given Host Controller.

This SOF packet broadcast occurs at a nominal frequency of 1 kHz (in the case of the High-Speed USB specification, 8 kHz). However the USB specification allows a very large frequency tolerance (by instrumentation standards) of some 500 parts per million. The background art utilises this low resolution frequency signal that is broadcast to each of the devices to provide clock synchronization, but only to the somewhat ambiguous frequency provided by the USB Host Controller.

U.S. Pat. No. 6,343,364 (Leydier et al.) discloses an example of frequency locking to USB traffic, which is directed toward a smart card reader. This document teaches a local, free-running clock that is compared to USB SYNC and packet ID streams; its period is updated to match this frequency, resulting in a local clock with a nominal frequency of 1.5 MHz. This provides a degree of synchronization sufficient to read smart card information into a host PC but, as this approach is directed to a smart card reader, inter-device synchronization is not addressed.

U.S. Pat. No. 6,012,115 and subsequent continuation U.S. Pat. No. 6,226,701 (Chambers et al.) address the USB SOF periodicity and numbering for timing. These documents disclose a computer system that can perform an accurate determination of the moment in time a predetermined event occurred within a real-time peripheral device by using the start of frame pulse transmitted from a USB host controller to peripheral devices connected to it.

However the methods taught by these documents do not involve the measurement of the frequency of a periodic data structure contained within the USB data traffic for determination of the absolute frequency of the master clock in the USB Host Controller, and in some cases rely on the provision of an additional counter in the host.

U.S. Pat. No. 6,092,210 (Larky et al.) discloses a method for connecting two USB hosts for the purpose of data transfer, by employing a USB-to-USB connecting device for synchronizing local device clocks to the data streams of both USB hosts. Phase locked loops are used to synchronize local clocks and over-sampling is used to ensure that data loss does not occur. This document, however, relates to the synchronization of the data streams of two USB hosts with each other (and with limited accuracy) such that transfer of information is then possible between said Hosts. This document does not teach any method for synchronizing a plurality of USB devices to a single USB Host or to a plurality of USB hosts.

The USB specification was written with audio applications in mind, and U.S. Pat. No. 5,761,537 (Sturges et al.) describes how to synchronize two or more pairs of speakers with individual clocks, where one pair operates off a stereo audio circuit in the PC and the other pair is controlled by the USB. Both speaker pairs use their own clocks, so they need to be synchronized; this document teaches one technique for maintaining synchronization of the audio signals despite possible clock skew between the asynchronous clocks.

U.S. patent application Ser. No. 10/620,769 (Foster et al.) discloses a synchronized version of the USB, in which the local clock of each device is synchronized on a given USB to an arbitrary degree. This document also discloses a method and apparatus for providing a trigger signal to each device within the USB such that an event may be synchronously initiated on multiple devices by the trigger signal.

However the latency associated with conventional USB messaging still prevents one USB device from receiving a trigger and distributing it to other devices with minimal latency. This precludes multiple USB data acquisition devices from making a measurement sample simultaneously and synchronously, within some nominal tolerance, when one of the devices receives an external trigger signal.

In a traditional rack-based measurement system such as VXI or PXI, there is a timing backplane in the rack that allows devices to share trigger signals between slots in the rack. USB does not have any of these capabilities and this has severely limited USB's application in data acquisition, measurement, automation and control applications.

FIG. 1 is a schematic diagram of a background art synchronized USB system 10, including a where a personal computer 12, containing a USB Host Controller having a USB, hosts a network of USB expansion hubs 14 and USB devices 16. Each of the USB devices 16 has its own respective local clock (not shown).

This architecture for synchronizing these local clocks relies on periodic data structures present in the USB traffic. Thus, a preferred embodiment of U.S. patent application Ser. No. 10/620,769 (Foster et al.) essentially locks the local clock in frequency and phase to the detection of a SOF packet token at the USB device; circuitry observes traffic through the USB and decodes a clock carrier signal from bus traffic (in the preferred embodiment comprising SOF packets) which results in a nominal carrier signal frequency of 1 kHz (or 8 kHz for USB High Speed). The local clock signal from a controlled oscillator clock is locked to the reception of the USB SOF packet in both phase and frequency. This ensuring that all devices attached to the root hub are locked in frequency to the point at which they receive the SOF packet token.

Another synchronized USB device, disclosed in WO 2007/092997 filed 15 Feb. 2007 (Foster et al.), employs a local reference clock register that is clocked from the synchronised local clock. A hybrid USB hub (comparable to USB hub 14 of FIG. 1) is disclosed, having an additional data pathway that allows control loop latency to be reduced. FIG. 2 is a schematic diagram of this hybrid USB hub 30, which has an upstream port 32, a plurality of downstream ports 34 a low latency data bypass port 36, conventional USB hub circuitry 38 and data bypass circuitry 40.

FIG. 3 is a detailed schematic of data bypass circuitry 40 of FIG. 2, simplified from WO 2007/092997 for clarity. Data bypass circuitry 40 has an upstream port 42 for connection to the Host Controller side of the bus, a downstream port 44 for connection to the device side of the bus (in the preferred embodiment this connects to a conventional USB hub circuitry chip), a low latency data bypass port 46 and a USB data multiplexer switch 48.

Thus, data bypass circuitry 40 is able to monitor all USB data packets and provide a buffered replica signal 50 of USB data signals for use by external circuitry. Buffered replica signal 50 can be used by external circuitry for decoding periodic signal structures from the Host Controller within USB data to identify carrier signals which contain information about the clock rate of the USB Host Controller. Buffered replica signal 50 can also be used to decode information from all downstream USB devices as it passes upstream toward the Host Controller. In this way, direct action can be taken on the information from downstream devices without first requiring the Host Controller and associated operating system to process and act on the data.

Data bypass circuitry 40 also includes additional circuitry for advanced data management, switching and reducing USB control loop latency, including a USB data multiplexing switch 48 (shown as a pair of simple single pole switches 52 and 54 of FIG. 3 for simplicity, though in reality USB data signals are differential). USB data multiplexing switch 48 contains an upstream switch 52 and a downstream switch 54, and is configured to synchronously direct USB data signals from upstream port 42 either directly to the downstream port 44 (the configuration shown) or utilising a bidirectional data stream 50 from external circuitry via bidirectional data port 46. Switch controller logic has not been shown for simplicity.

Data bypass circuitry 40 is also able to dynamically configure itself to insert data within a USB data stream. A message from the Host Controller to a device may be intercepted and altered by USB monitoring circuitry. In this way, software can be configured to provide regular polling of a particular USB device with a known data packet size. USB monitoring circuitry, having access to the size of a specified regularly polled packet, can insert data within the payload of a transaction by synchronously bypassing the direct connection (in the illustrated configuration of USB data switch 48) and inserting data into the payload field of the transaction.

While this system would achieve the desired outcome of reducing messaging latency in USB it requires special hardware to be included into a dedicated hybrid USB hub (or other device). Such hardware would preclude the system from reducing data acquisition messaging and triggering of multiple devices within arbitrarily small time frames using a conventional USB architecture.

SUMMARY OF THE INVENTION

In a first broad aspect, the invention provides a method of controlling one or more devices (such as USB devices) in data communication with a common controller to perform one or more functions, each of the devices having a synchronous clock, a synchronized real time clock register and a memory, the method comprising:
   arming the devices such that the devices commence performing the functions synchronously, receive and store to their respective memory data acquired as a result of performing the functions and store to their respective memory time stamp information indicative of the time of acquisition of the acquired data;
   a trigger device in data communication with the common controller responding to a command (such as in the form of an external trigger signal) to perform the functions by sending a first message to the host controller that includes data indicative of a time of receipt of the command;
   the host controller responding to the first message by sending the devices a second message including data indicative of the time of receipt by the further device of the command; and
   the devices responding to the second message by reading their respective memories and sending the acquired data stored therein to the host controller commencing from a location in each respective memory corresponding to the time of receipt or a next available location.

As will be appreciated by the skilled person, the clocks of the devices are "synchronous" (i.e. with each other) in the ordinary sense that there is a known correspondence—which may be one of identity—between the time according to any one clock and the time according to any other of the clocks.

The trigger device may be one of the devices, but in some embodiments the trigger device is not one of the devices.

In one embodiment, the clocks are frequency and phase locked.

In one embodiment, the real time clock registers are synchronised to a common epoch and clocked by the respective synchronous clock.

In a particular embodiment, arming the plurality of the devices includes the devices initiating the instructions.

The method may include the devices measuring and recording a state of a plurality of externally provided signals (including, for example, measuring an amplitude of an analogue signal).

The memory may be configured to overwrite an oldest reading once it becomes full.

The method may include providing the command to perform the functions with a time stamp indicative of the time of receipt by the trigger device.

The method may include transmitting the time stamp the devices.

The controller may comprise a USB host, and the devices USB devices.

The method may include transmitting the time stamp via USB transactions.

The USB transactions may comprise;
   the host controller polling the first device;
   the trigger device responding to a polled request by sending a first message to the host controller, including data indicative of the time of receipt of the command with respect to the common notion of time; and
   the host controller sending the devices a second message including data indicative of the time of receipt of the command with respect to the common notion of time.

The method may include transmitting the time stamp via non-USB transactions.

The method may include transmitting the time stamp by radio transmission, optical transmission or other electrical signals.

In one embodiment, the functions comprise time sequenced instructions to be executed at specified times relative to the time of receipt of the command by the trigger device.

In a particular embodiment, the functions comprise any one or more instructions selected from the group comprising: acquiring data, measuring a physical transducer, monitoring external equipment or instrumentation, initiating or stopping the transmission of a clock signal, initiating or stopping the transmission of a bit pattern, initiating or stopping the transmission of a control sequence and controlling external equipment or instrumentation.

According to this aspect, in one embodiment the invention provides a method of employing a first device of a plurality of devices that are in data communication with a common controller to control the other one or more devices of said plurality of devices to collect data, each of said devices having a synchronous clock, a synchronized real time clock register and a memory, the method comprising:
   arming said other devices such that said other devices synchronously commence acquiring data, storing to the respective memory the data once acquired and storing to the respective memory time stamp information indicative of the time of acquisition of at least some of the acquired data;
   the first device responding to a data collection command to collect data (such as in the form of an external trigger signal) by sending a first message to the host controller (typically during a normal polling routine) that includes data indicative of a time of receipt of the data collection command;
   the host controller responding to the message by sending the other devices a second message including data indicative of the time of receipt by the first device of the data collection command; and the other devices responding to the second message by reading their respective memories and sending acquired data stored therein to the host controller commencing from a location in each respective memory corresponding to the time of receipt or a next available location.

In one embodiment, the plurality of devices is in the form of a plurality of USB devices, and the controller comprises a USB host controller, and the method comprises:

arming said other USB devices such that said other USB devices synchronously commence acquiring data, store to the respective memory the data once acquired and store to the respective memory time stamp information indicative of the time of acquisition of at least some of the acquired data;

the first USB device responding to a data collection command to collect data (such as in the form of an external trigger signal) by sending a first message to the host controller (typically during a normal polling routine) that includes data indicative of a time of receipt of the data collection command;

the host controller responding to the message by sending the other USB devices a second message including data indicative of the time of receipt by the first USB device of the data collection command; and the other USB devices responding to the second message by reading their respective memories and sending acquired data stored therein to the host controller commencing from a location in each respective memory corresponding to the time of receipt or a next available location.

Thus, the measurement latency is then only limited by the measurement sample period of the, for example, USB data acquisition devices, which is typically much smaller than the feature size of the signal being measured. In one embodiment, the synchronous clocks keep time by being phased locked, and the real-time clock register of each device contains the exact time and is clocked from the respective synchronous clock.

In some embodiments, the method includes arming the first USB device when arming the other USB devices, so that data is acquired by both the first USB device and the other USB devices.

In certain embodiments, further USB devices are in data communication with the host controller and the method includes selectively arming said other USB devices but not the further USB devices.

The arming of each of the other USB devices may be compared to the arming of an oscilloscope to receive a trigger.

In one embodiment, the time stamp information comprises separate time stamp information for each item of acquired data, and the method includes associating the respective time stamp information with the corresponding piece of acquired data. In another embodiment, the method includes each other USB device storing time stamp information only when commencing the acquiring of data, in which case the state-machine nature of the method allows each item of acquired data to be correlated with a specific time of acquisition.

In one embodiment, if any of the memories is filled, the method includes overwriting over previously saved acquired data in a ring buffer arrangement. In this embodiment, if time stamp information is saved to the respective memory only when commencing the acquiring of data, the method includes saving new time stamp information to the respective memory.

The command to collect data received by the first USB device may, in a rack-based system, be passed down a timing backplane and shared with the other USB devices with minimal latency. However there would still be some latency owing to the propagation time of the signals.

In a second broad aspect the invention provides a system for acquiring data, comprising:

a USB host controller; and a plurality of USB devices in data communication with the USB host controller, each having a synchronous clock, a synchronized real time clock register and a memory;

wherein the USB devices are controllable to synchronously commence acquiring data, to store to the respective memory the data once acquired and to store to the respective memory time stamp information indicative of the time of acquisition of at least some of the acquired data, a first of the USB devices is configured to respond to a data collection command to collect data by sending a first message that includes data indicative of a time of receipt of the data collection command to the host controller, the host controller is configured to respond to the first message by sending the other USB devices a second message including the data indicative of the time of receipt by the first USB device of the data collection command, and the other USB devices are configured to respond to the further message by reading their respective memories and sending acquired data stored therein to the host controller commencing from a location in each respective memory corresponding to the time of receipt or a next available location.

In one embodiment, the invention provides a USB system, comprising:

a plurality of USB networks, each comprising a USB host controller and a plurality of synchronised USB devices, said plurality of USB networks being synchronised such that said plurality of USB devices across said plurality of USB networks are mutually synchronised;

wherein said USB devices are configured (i) to execute a plurality of instructions upon receipt of an external trigger signal, said instructions comprising that the respective USB device make a measurement of one or more parameters of said respective USB device, (ii) to time stamp said respective measurement, and (iii) record said measurement in a respective local memory; and wherein a first of said USB devices is configured to notify its respective USB host controller upon receipt of said external trigger signal, said respective USB host controller is configured to respond to being notified of said receipt by notifying each of said other USB devices connected to the respective USB host controller and the one or more other of said USB host controllers of the receipt of said external trigger signal and its associated timestamp by said first USB device, said other of said USB host controllers are configured to notify their respective USB devices of the occurrence of said external trigger signal and its associated timestamp, said plurality of USB devices on the other of said USB networks are configured to transmit a content of their respective local memories to their respective USB host controller in response to receiving said notification of said receipt, and said plurality of USB devices on said other of said USB networks are configured to execute their respective plurality of instructions in response to receiving notification of said receipt.

The present invention also provides a trigger device, comprising:

a local clock synchronisable to the local clock of a plurality of USB devices attached to a common USB host controller;

wherein the trigger device is configured to time stamp an external trigger signal upon receipt thereof, and to notify the USB host controller of the receipt and of the time stamp.

The trigger device may be configured to execute a set of instructions and buffer time stamped results thereof in local memory, and to transmit the buffered and time stamped results to the USB host controller after receipt of the external trigger signal.

The invention still further provides a USB device, comprising:
a local clock; and
a local memory;
wherein the local clock is synchronisable to a local clock of one or more other USB devices, and the USB device is configured to receive a set of instructions from a USB host controller, to initiate the instructions and buffer results in the local memory, and to respond to receiving notification of the time that an external trigger signal was received by a trigger device by transmitting the buffered results to the USB host controller.

In a third broad aspect the invention provides a method for reducing triggering latency of a plurality of USB devices of a plurality of respective networks, wherein each network comprises a USB host controller and a plurality of synchronised USB devices, and said plurality of networks are themselves synchronised by externally derived common reference time signals.

According to this broad aspect, the invention provides a method of controlling a plurality of USB devices across a plurality of USB networks to perform at least one function, wherein each of the USB networks has a host controller, the host controllers are in mutual data communication and each of the plurality of USB devices comprise a synchronous clock, a common notion of time, a synchronized real time clock register and a memory, the method comprising:
synchronising the plurality of USB networks such that each of the plurality of USB devices on each of the plurality of USB networks operates with a common notion of time;
arming the USB devices such that the devices synchronously commence performing the function, storing to the respective memory data received as a result thereof and storing to the respective memory time stamp information indicative of the time of acquisition of the acquired data;
trigger device attached (typically during a normal polling routine) to a first of the host controllers responding to a command (such as in the form of an external trigger signal) to perform the function by sending a first message to the first host controller that includes data indicative of a time of receipt of the command;
the first host controller responding to the first message by sending the USB devices attached thereto a second message including data indicative of the time of receipt by the first device of the command, and by sending the other of the host controllers a third message including data indicative of the time of receipt by the first device of the command;
each of the other host controllers sending a plurality of other messages to the respective USB devices attached thereto including data indicative of the time of receipt by the first device of the command; and
the USB devices responding to the second and subsequent messages by reading their respective memories and sending the acquired data stored therein to their respective host controllers commencing from a location in each respective memory corresponding to the time of receipt of external trigger or a next available location.

It should be noted that the various features of each of the above aspects of the invention can be combined as desired.

In addition, apparatuses according to the invention can be embodied in various ways. For example, such devices could be constructed in the form of multiple components on a printed circuit or printed wiring board, on a ceramic substrate or at the semiconductor level, that is, as a single silicon (or other semiconductor material) chip.

BRIEF DESCRIPTION OF THE DRAWING

In order that the present invention may be more clearly ascertained, an embodiment will now be described, by way of example, with reference to the accompanying drawing, in which.

DETAILED DESCRIPTION OF THE INVENTION

Figure 1:
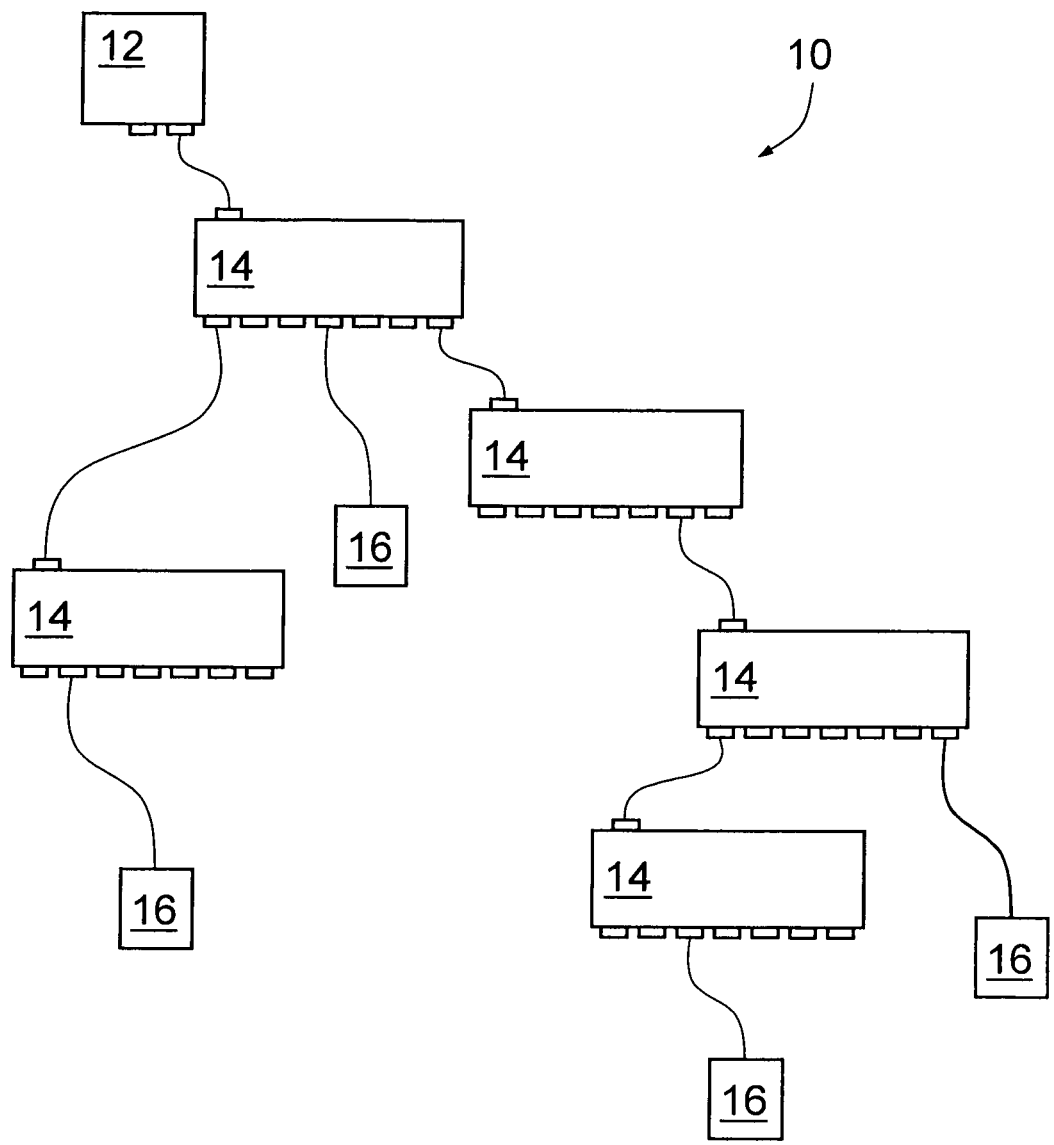
FIG. 1 is a schematic diagram of a background art synchronized USB system.
Figure 2:
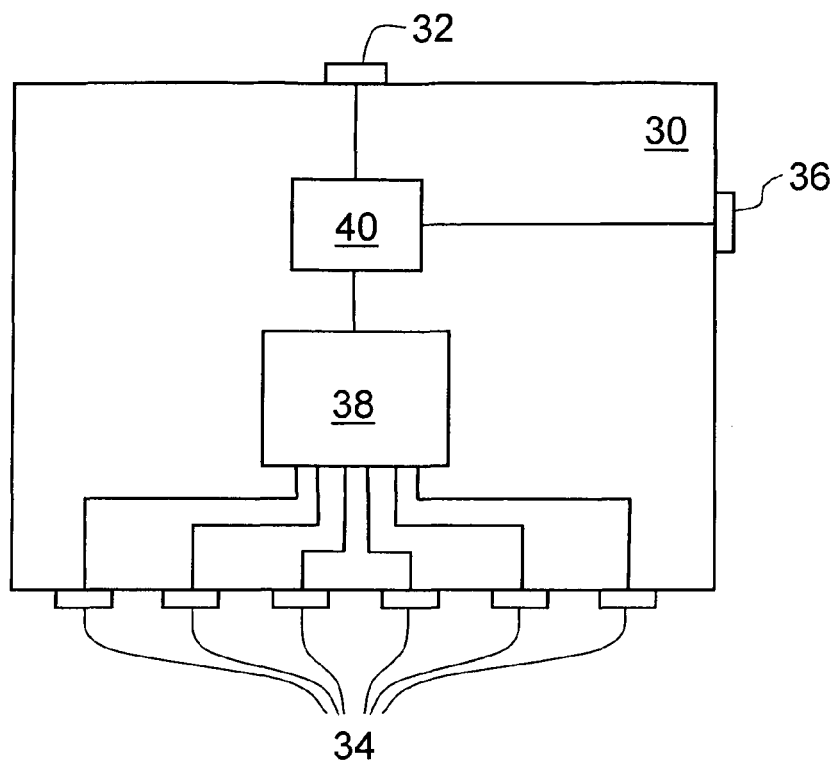
FIG. 2 is a schematic diagram of a background art hybrid USB hub device that allows reduced latency in USB messaging.
Figure 3:
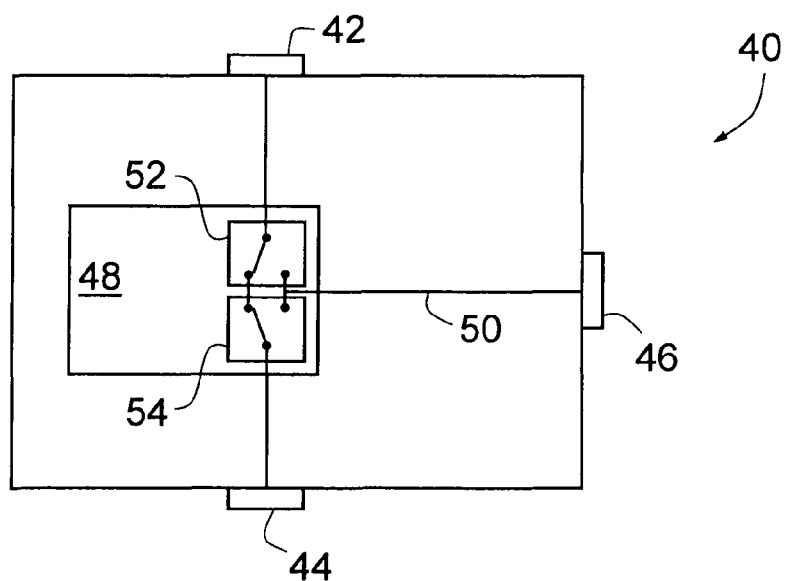
FIG. 3 is a schematic diagram of the data bypass circuitry of the hybrid USB hub of FIG. 2.
Figure 4:
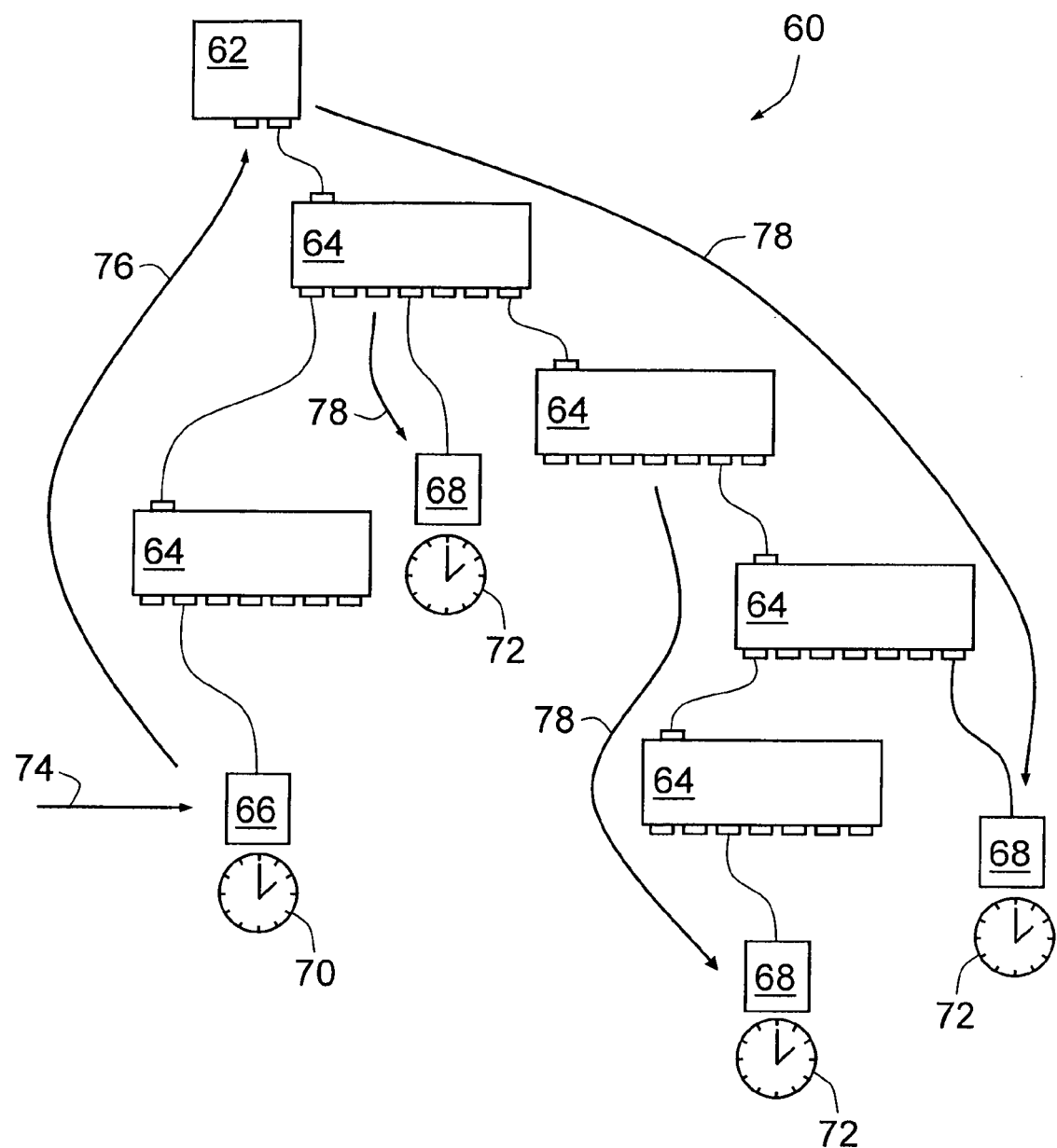
FIG. 4 is a schematic diagram of a synchronized USB data acquisition system according to an embodiment of the present invention, showing trigger events and message flow within the system.

FIG. 4 is a schematic diagram of a synchronized USB data acquisition system 60 according to an embodiment of the present invention. System 60 includes a personal computer 62, a plurality of USB expansion hubs 64, a first USB data acquisition device 66 and a plurality of second USB data acquisition devices 68.

Data acquisition devices 66, 68 are synchronized, that is, have synchronized real time clocks (not shown) which are themselves clocked from respective synchronous local clocks 70, 72 (as taught in International Patent Application WO 2007/092997, incorporated herein by reference).

Data acquisition devices 66, 68 may be of similar or different type, such as digital measuring apparatuses, analog signal measuring apparatuses, strain gauges or vibration measurement devices.

First USB data acquisition device 66 is configured to respond to an external trigger signal 74 and to use this signal to begin acquisition on all USB data acquisition devices 66, 68. First data acquisition device 66 records the reception time of external trigger signal 74 against its internal real time clock register (cf. background real time clock register of FIG. 22 of WO 2007/092997).

First USB data acquisition device 66 then sends a message 76 to the system controller personal computer 62 that includes a "trigger valid" message and data indicative of the time of receipt by the first USB device 66 of the external trigger signal 74. Personal computer 62 broadcasts (either serially or in parallel) a message 78 to each of the other USB data acquisition devices 68, that includes the "trigger valid" message and the data indicative of the time of receipt by the first USB device 66 of the external trigger signal 74. In this way, each device is informed of the real time of an external trigger signal 74 provided to the first (or, in principle, any other) USB device 66.

Figure 5:
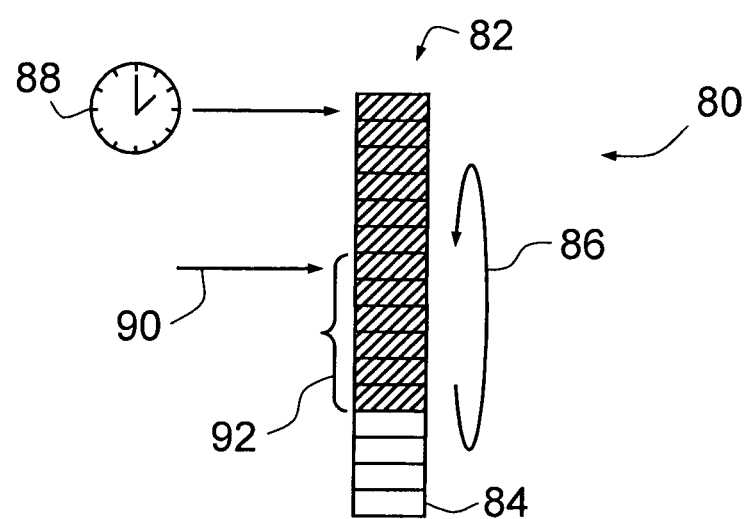
FIG. 5 is a schematic diagram of the address space of a memory device contained in one of the synchronized USB devices of FIG. 4.

FIG. 5 is a schematic representation of the memory map 80 of the physical memory of each of second USB data acquisition devices 68 of FIG. 4. Memory map 80 includes addressable memory structure 82 corresponding to a physical memory device and comprising a plurality of memory addresses (such as memory address 84). By way of example, empty memory addresses, such as memory address 84, are shown unshaded and memory locations containing data are shown shaded: data is stored at the memory addresses sequentially.

The memory controller (not shown) of each USB data acquisition device 66, 68 fills the memory addresses of memory structure 82 sequentially with data corresponding to sequential measurements. Typically, a data acquisition device will make measurements in a regimented time sequence. In this way, a known temporal relationship exists between subsequent physical memory addresses in the memory device.

The memory controller in this case is organized such that the physical memory device constitutes a ring buffer. With this memory structure, the memory controller fills sequentially memory addresses with data. When the last memory address has been filled, the memory controller "rolls-over" 86, that is, returns to the first memory address and continues to fill from that location. This results in the overwriting of earlier data in memory.

In this embodiment, the first memory address (or first few memory addresses depending on the size requirements) store the real time 88 (from real time register) corresponding to the moment in time of the first measurement in the memory. This is updated every time the memory controller "rolls-over" and begins to overwrite data.

At some point in time (corresponding to data being stored at a memory address 90), external trigger signal 74 is recorded at first USB data acquisition device 66, unbeknownst to second USB data acquisition device 68. Second USB data acquisition device 68 continues to make measurements and record data in its memory. Subsequently, a message is received by second USB data acquisition device 68 informing it of the time 90 that the external trigger signal 74 occurred on the first USB device 66.

Second USB data acquisition device 68 uses the time marker in the first location in memory and the known data measurement rate to search back through the data record in memory to locate the data measurement stored at memory address 90, made at the time corresponding to external trigger signal 74 occurring on the first USB data acquisition device 66. Data saved since that time (stored at memory addresses 92) is then transferred to the host computer, followed by further measurements, which continue to be made by the data acquisition function of the second USB data acquisition device 68.

In this way, the data stored at memory addresses 92, which would normally be lost due to USB latency, is recovered and can be used in the measurement record.

It should be appreciated that first USB data acquisition device 66 would normally engage in the data collection along with second USB data acquisition device(s) 68, but this is not essential. First USB data acquisition device 66 will generally be configured slightly differently as it will typically be configured to await the external trigger signal 74 and pass it to the other USB device(s) 68 via the host controller. The fact that it may also engage in data acquisition based on the trigger event is secondary to its somewhat special role or configuration.

Modifications within the scope of the invention may be readily effected by those skilled in the art. It is to be understood, therefore, that this invention is not limited to the particular embodiments described by way of example hereinabove and that combinations of the various embodiments described herein are readily apparent to those skilled in the art.

In the preceding description of the invention, except where the context requires otherwise owing to express language or necessary implication, the words "Host Controller" refers to a standard USB Host controller, a USB-on-the-go Host Controller, a wireless USB Host Controller or any other form of USB Host Controller.

In the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge.

The invention claimed is:

1. A method of controlling one or more USB devices in data communication with a common controller to perform one or more functions, each of said USB devices having a synchronous clock, a synchronized real time clock register and a memory, tile method comprising:
   arming said USB devices such that said USB devices commence performing said functions synchronously, receive and store to their respective memory data acquired as a result of performing said functions and store to their respective memory time stamp information indicative of the time of acquisition of the acquired data;
   a trigger device in data communication with said controller responding to a command to perform said functions by sending a first message to said controller that comprises data indicative of a time of receipt of the command, including providing said command with a time stamp indicative of said time of receipt by said trigger device;
   said controller responding to said first message by sending said USB devices a second message that comprises data indicative of the time of receipt by the trigger device of the command; and
   said USB devices responding to said second message by reading their respective memories and sending the acquired data stored therein to said controller commencing from a location in each said respective memory corresponding to said time of receipt or a next available location; and
   transmitting said time stamp via USB transactions that comprise:
      i) said controller polling said trigger device;
      ii) said trigger device responding to a polled request by sending a first message to said host controller, including data indicative of the time of receipt of said command with respect to said common notion of time; and
      iii) said controller sending said USB devices a second message including data indicative of the time of receipt of said command with respect to said common notion of time;
   wherein said function comprises time sequenced instructions to be executed at specified times relative to the time of receipt of said command by said trigger device.

2. A system for acquiring data, comprising:
a USB host controller; and
a plurality of USB devices in data communication with the USB host controller, each having a synchronous clock, a synchronized real time clock register and a memory;
wherein the USB devices are controllable to synchronously commence acquiring data, to store to the respective memory the data once acquired and to store to the respective memory time stamp information indicative of the time of acquisition of at least some of the acquired data, a first of the USB devices is configured to respond to a data collection command to collect data by sending a first message that includes data indicative of a time of receipt of the data collection command to the host controller, the host controller is configured to respond to the first message by sending to the other USB devices a second message including the data indicative of the time of receipt by the first USB device of the data collection command, the other USB devices are configured to respond to the further message by reading their respective memories and sending acquired data stored therein to the host controller commencing from a location in each respective memory corresponding to the time of receipt or a next available location, and said USB devices are configured subsequently to continue to acquire and store said data to their respective memory for subsequent transmission to said host controller.

3. A USB system, comprising:
a plurality of USB networks, each comprising a USB host controller and a plurality of synchronised USB devices, said plurality of USB networks being synchronised such that said plurality of USB devices across said plurality of USB networks are mutually synchronised;
wherein said USB devices are (i) armed to synchronously execute a plurality of instructions, said instructions comprising that the respective USB device make a measurement of one or more parameters of said respective USB device, (ii) configured to time stamp said respective measurement, and (iii) configured to record said measurement in a respective local memory; and
wherein a first of said USB devices is configured to notify its respective USB host controller upon receipt of an external trigger signal, said respective USB host controller is configured to respond to being notified of said receipt by notifying each of said other USB devices connected to the respective USB host controller and the one or more other of said USB host controllers of the receipt of said external trigger signal and its associated timestamp by said first USB device, said other of said USB host controllers are configured to notify their respective USB devices of the occurrence of said external trigger signal and its associated timestamp, said plurality of USB devices on the other of said USB networks are configured to transmit a content of their respective local memories to their respective USB host controller in response to receiving said notification of said receipt, and said plurality of USB devices on said other of said USB networks are configured to execute their respective plurality of instructions in response to receiving notification of said receipt, wherein said USB devices are configured subsequently to continue to perform according to said respective instructions.

4. A system as claimed in claim 3, wherein at least some of said plurality of USB devices are configured to commence upon initiation performing their respective instructions and buffering results in local memory until receiving notification of said receipt.

5. A method of controlling a plurality of USB devices across a plurality of USB networks to perform at least one function, wherein each of said USB networks has a host controller, said host controllers are in mutual data communication and each of said plurality of USB devices comprise a synchronous clock, a common notion of time, a synchronized real time clock register and a memory, the method comprising:
synchronising said plurality of USB networks such that each of said plurality of USB devices on each of said plurality of USB networks operates with a common notion of time;
arming said USB devices such that said devices synchronously commence performing the function, storing to the respective memory data received as a result thereof and storing to the respective memory time stamp information indicative of the time of acquisition of the acquired data;
trigger device attached to a first of said host controllers responding to a command to perform the function by sending a first message to said first host controller that includes data indicative of a time of receipt of the command;
said first host controller responding to the first message by sending said USB devices attached thereto a second message including data indicative of the time of receipt by the first device of the command, and by sending the other of said host controllers a third message including data indicative of the time of receipt by the first device of the command;
each of said other host controllers sending a plurality of other messages to said respective USB devices attached thereto including data indicative of the time of receipt by the first device of the command; and
said USB devices responding to the second and subsequent messages by reading their respective memories and sending the acquired data stored therein to their respective host controllers commencing from a location in each respective memory corresponding to said time of receipt of external trigger or a next available location, and after receiving said messages continuing to perform said function and to store to the respective memory data received as a result thereof, for subsequent transmission to said host controller, and time stamp information indicative of the time of acquisition of the acquired data.

* * * * *